(12) United States Patent
Russek et al.

(10) Patent No.: US 12,523,430 B2
(45) Date of Patent: Jan. 13, 2026

(54) INTEGRATED KNOCKOUT DRUM AND HEAT EXCHANGER FOR USE IN CLEANING PROCESS

(71) Applicant: Refined Technologies, Inc., Spring, TX (US)

(72) Inventors: Michael J. Russek, Corpus Christi, TX (US); William J. Drennan, Spring, TX (US)

(73) Assignee: Refined Technologies, Inc., Spring, TX (US)

( * ) Notice: Subject to any disclaimer, the term of this patent is extended or adjusted under 35 U.S.C. 154(b) by 232 days.

(21) Appl. No.: 18/040,850

(22) PCT Filed: Aug. 10, 2021

(86) PCT No.: PCT/US2021/045403
§ 371 (c)(1),
(2) Date: Feb. 7, 2023

(87) PCT Pub. No.: WO2022/035873
PCT Pub. Date: Feb. 17, 2022

(65) Prior Publication Data
US 2023/0272979 A1 Aug. 31, 2023

Related U.S. Application Data

(60) Provisional application No. 63/064,756, filed on Aug. 12, 2020.

(51) Int. Cl.
*F28D 7/16* (2006.01)
*B08B 3/08* (2006.01)

(52) U.S. Cl.
CPC .............. *F28D 7/1607* (2013.01); *B08B 3/08* (2013.01); *B08B 2230/01* (2013.01)

(58) Field of Classification Search
None
See application file for complete search history.

(56) References Cited

U.S. PATENT DOCUMENTS 3,749,647 A * 7/1973 Micklewright ......... C07C 51/42
202/153
4,028,072 A 6/1977 Braun et al.
(Continued)

FOREIGN PATENT DOCUMENTS

DE 19653613 A1 6/1998

OTHER PUBLICATIONS

Graham-Mfg, "Understanding Process Vacuum Condensers." VACAdemics, Issue 3, www.graham-mfg.com, 4 pages.
(Continued)

*Primary Examiner* — Kaj K Olsen
*Assistant Examiner* — Pradhuman Parihar
(74) *Attorney, Agent, or Firm* — Blank Rome LLP

(57) ABSTRACT

A unit and system are operable with cooling fluid for handling effluent produced in a cleaning process of refinery equipment. A drum of the unit has an inlet for the effluent, a liquid outlet for condensed effluent, and a vapor outlet for uncondensed effluent. A shell disposed in an interior of the drum and has a passage communicating outside the drum. A heat exchanger is disposed in the passage of the shell. As the effluent from the inlet enters the shell's passage at the distal end of the shell, the heat exchanger cools the effluent using cooling fluid cycled through the heat exchanger. Condensed effluent escaping from the shell can fill the drum's interior up to a liquid level. Uncondensed effluent escaping from the shell can collect in the open space of the drum, being subject to further condensation.

23 Claims, 9 Drawing Sheets

(56) References Cited

U.S. PATENT DOCUMENTS

| | | | |
|---|---|---|---|
| 6,290,778 B1* | 9/2001 | Zugibe | F28G 7/00 |
| | | | 134/1 |
| 6,872,263 B1 | 3/2005 | Jansen et al. | |
| 6,893,509 B2 | 5/2005 | Sears et al. | |
| 8,480,812 B2 | 7/2013 | Nath et al. | |
| 9,017,488 B2 | 4/2015 | Nath et al. | |
| 9,452,941 B2 | 9/2016 | Sears | |
| 9,605,234 B2 | 3/2017 | Sears | |
| 9,625,192 B1 | 4/2017 | Briggeman | |
| 9,751,773 B1 | 9/2017 | Xie | |
| 10,577,563 B2 | 3/2020 | Sears et al. | |
| 11,306,260 B1* | 4/2022 | Cox | B01D 17/047 |
| 2017/0254596 A1* | 9/2017 | Noel-Baron | F28D 9/005 |
| 2019/0329150 A1* | 10/2019 | Fleming | B01D 3/007 |
| 2020/0047098 A1 | 2/2020 | Zapletal | |

OTHER PUBLICATIONS

International Search Report and Written Opinion issued Nov. 22, 2021 in counterpart PCT application No. PCT/US2021/045403.

* cited by examiner

INTEGRATED KNOCKOUT DRUM AND HEAT EXCHANGER FOR USE IN CLEANING PROCESS

CROSS-REFERENCE TO RELATED APPLICATIONS

This application is a national stage of International Application No. PCT/US2021/045403 filed, Aug. 10, 2021, which claims the benefit of U.S. Provisional Application No. 63/064,756, filed Aug. 12, 2020, both of which are incorporated herein by reference in their entirety.

BACKGROUND OF THE DISCLOSURE

A refinery uses a number of pieces of equipment for petroleum processing. The refinery equipment includes pumps, control valves, towers, heat exchangers, vessels and the like. Each piece of equipment is single-purpose and used for very different and distinct purposes.

After a period of use, contaminants may develop on the refinery equipment, which impedes performance. Therefore, the contaminants must be periodically removed to maintain performance at an acceptable level.

For example, heat exchangers used in refining petroleum are prone to fouling and must often be taken out of service for cleaning. For this reason, these heat exchangers are typically arranged in a "train" at the refinery so one can be removed for cleaning without stopping production altogether.

Pumps, control valves, and other dynamic devices having moving parts used in refining petroleum can be prone to fouling. Vessels are not as prone to fouling and may not need to be taken out of service. Towers used for separating hydrocarbon components can foul over time and need to be cleaned. In contrast to heat exchangers, towers, vessels, and the like used in refining are typically large and do not typically have a redundant arrangement.

The contaminants removed from refinery equipment typical includes hydrocarbons found in crude oil. These hydrocarbons will vary in molecular weight and structure. The industry refers to these different structures as Light End, Medium, and Heavy. Light Ends would include cuts like methane, propane, and ethane. Medium cuts would include kerosene, gasoline, and diesel, among others. Heavy cuts would include lubricants, waxes and asphalt.

A conventional method for cleaning refinery equipment, such as pumps and control valves, involves complete disassembly of the equipment followed by manual cleaning. Other cleaning methods involve introducing a cleaning agent and steam into the refinery equipment using a vapor-phase chemical cleaning process. The cleaning agent used can be comprised of terpene and surfactant. The steam volatilizes the cleaning agent and can quickly dissolve the organic residues from inside the equipment.

Such a vapor-phase chemical cleaning process can produce a two-phase effluent that contains high amounts of light to non-condensable gases ($C_5$ and lighter). The effluent of hydrocarbons and steam needs to be properly handled for environmental safety. As will be appreciated, handling such effluent offers a number of challenges when refinery equipment is cleaned.

The subject matter of the present disclosure is directed to overcoming, or at least reducing the effects of, one or more of the problems set forth above.

DETAILED DESCRIPTION OF THE DISCLOSURE

Figure 1:
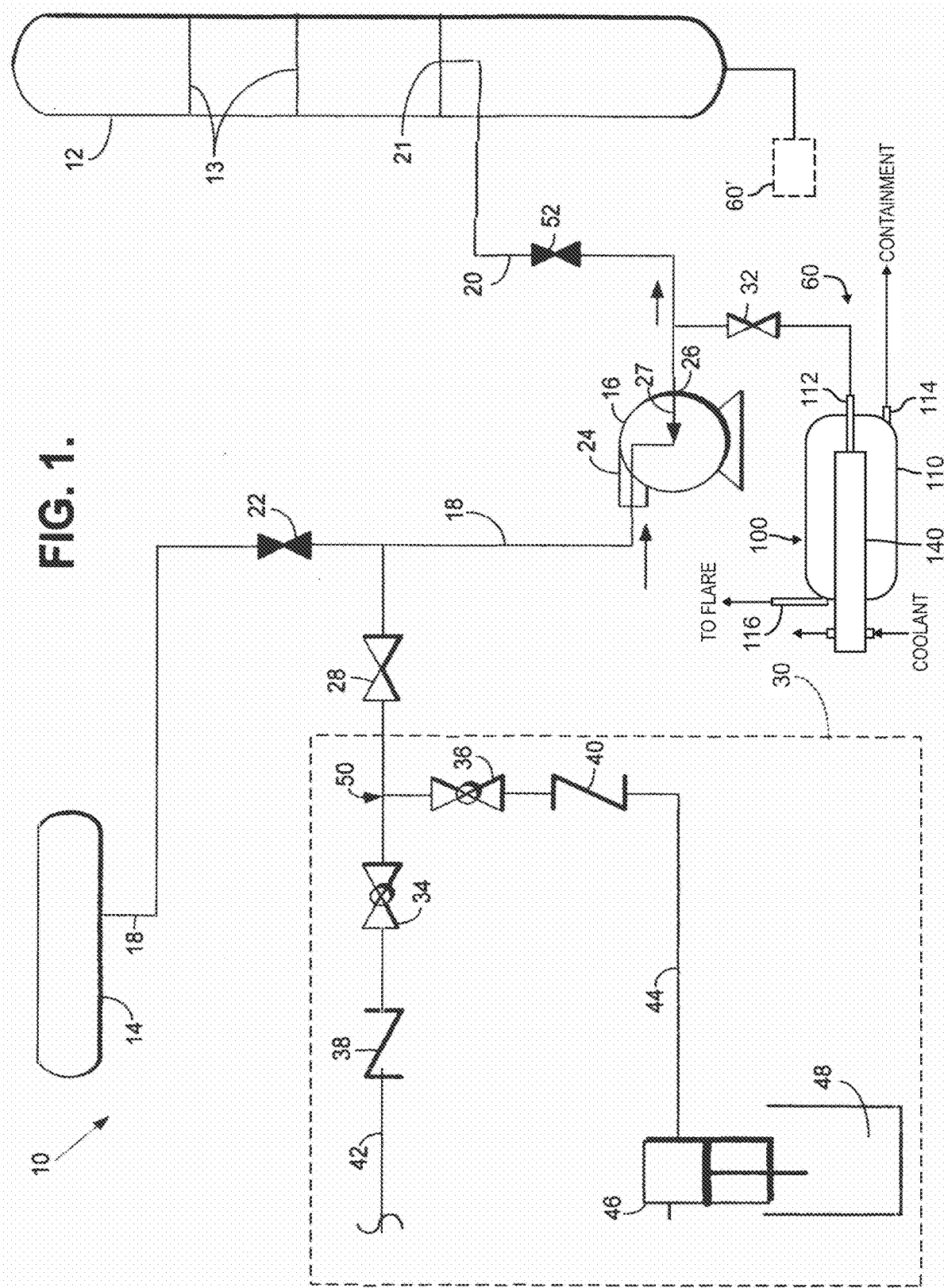
FIG. 1 illustrates a cleaning system for cleaning refinery equipment and having a handling system according to the present disclosure.

As shown in FIG. 1, a vapor-phase chemical cleaning system 30 is used for cleaning refinery equipment with a cleaning agent. The cleaning system 30 is further configured to handle the effluent produced during the cleaning process by using a handling system according to the present disclosure. The effluent is a discharge of steam, water, vapor, cleaning agent, hydrocarbon products, and other waste and drainage of the refinery equipment.

The cleaning system 30 includes a source of the cleaning agent configured to connect upstream of the refinery equipment (e.g., pump, control valve, tower, etc.), and is configured to deliver the cleaning agent to the refinery equipment. In turn, the handling system 60 is used with the cleaning system 30 during the cleaning process and/or after the cleaning process to handle the effluent produced.

As briefly shown in FIG. 1, the handling system 60 include a handling unit 100 according to the present disclosure that is configured to connect to the refinery equipment and is configured to receive the effluent. The unit 100 includes an integrated knockout drum 110 and heat exchanger 140 connected in the cleaning process to handle the effluent from the cleaning process before the effluent proceeds to post processing or containment.

As disclosed herein, a two-phase effluent is generated during vapor-phase chemical cleaning of the refinery equipment. This effluent can contain high amounts of light to non-condensable gases ($C_5$ and lighter). Condensable gases C5's and heavier along with steam are condensed with the heat exchanger 140 incorporated into the knockout drum 110 of the unit 100. Some condensable hydrocarbons and steam may not be cooled enough by the heat exchanger 140. The knockout drum 110 immediately captures condensed and uncondensed effluent from the heat exchanger 140 and provides a direct open space for more effluent to fully disengage vapor and liquid. This direct open space is also subject to the immediate cooling by the heat exchanger 140.

In the end, the handling unit 100 provides a synergistic benefit of immediate cooling and direct space for bringing down the temperature of the effluent and allowing it to condense. The handling unit 100 can prevent vapor from exiting through a liquid outlet 114 of the drum 110, which can avoid causing pump cavitation and/or releases to atmosphere further downstream. At the same time as the immediate cooling and direct space provided, the handling unit 100 lowers the overall system pressure and flare load required so that the cleaning process can be completed more quickly and effectively.

The handling unit 100 improves handling of the effluent and improves the cleaning process in ways not possible when an independent heat exchanger is used with a separate knockout drum connected downstream from the heat exchanger. In particular, a free-standing heat exchanger has a small high-point vent to relieve non-condensable hydrocarbons to a flare or a scrubber system. Many condensable hydrocarbons and steam may not be cooled enough in such a free-standing heat exchanger and may escape through this vent, resulting in a higher system pressure and flare load. Furthermore, some vapor may exit through the liquid outlet of the free-standing heat exchanger and can cause pump cavitation and/or tank releases to atmosphere further downstream. Even with a separate drum placed downstream from the free-standing heat exchanger, the system still suffers from these underlying constraints. In the end, the cleaning process is slowed and less effective with such a configuration.

For these reasons, the cleaning process uses the handing unit 100 according to the present disclosure having the integrated drum 110 and heat exchanger 140, which cools the effluent, condenses the effluent, and provides open space for effluent to fully disengage vapor and liquid, while keeping system pressure and flare loads at lower, more efficient levels. A comparison between using the disclosed handling unit 100 versus a free-standing heat exchanger connected to a separate downstream drum will show that of the overall system pressure is reduced with the disclosed unit 100 and will show that the time required to complete a cleaning process is shortened. Furthermore, additional cooling may be achieved with the heat exchanger shell submerged in the liquid level of the vessel in turn improving condensing capacity In general, the handling system 60 and unit 100 having the integrated knockout drum 110 and heat exchanger 140 can be used with a number of cleaning processes, such as disclosed in U.S. Pat. Nos. 9,605,234; 9,452,941; 6,893,509; and 6,872,263, which are each incorporated herein by reference. In these processes, the handling unit 100 can follow these cleaning processes ('509/'263→'234/'941→unit 100). The handling unit 100 can also be used with a reactor cleaning processes, as described in the U.S. Pat. Nos. 8,480,812 and 9,017,488, which are also incorporated herein by reference. Here, the handling unit 100 may be used on the back end ('812/'488→unit 100). Finally, the handling unit 100 can also be used in an UpperCut cleaning process, as described in U.S. Pat. No. 10,577,563, which is incorporated herein by reference.

For the purposes of illustration, the cleaning system 30 in FIG. 1 is similar to that disclosed in U.S. Pat. No. 6,872,263. Used in conjunction with such a cleaning system 30, components of the handling system 60 are connected to the refinery arrangement 10 to handle effluent produced by the cleaning process before containment in a containment system or before other post processing. As shown briefly in FIG. 1, the unit 100 combines a condensing heat exchanger 140 disposed in a knockout drum 110. This integrated and self-contained unit 100 cools the effluent and provides an open space for vapor and liquid to disengage. The unit 100 condenses total effluent and off-gas vapor into the same drum volume of the knockout drum 110 without any additional connections or external hose/pipe.

In general, the cleaning system 30 can be used to clean a pump, a vessel, a control valve, a compressor, or other equipment in the refinery. The equipment can include any device that has moving parts or can include any equipment that in some way dynamically acts on crude oil or other products in a production process.

In the present example, an arrangement 10 commonly found in a refinery or other kind of processing center includes a tower 12 and a receiving vessel 14. The tower 12 has a number of trays 13 used as part of the refining process. A hydrocarbon "crude" mixture is introduced into the tower 12 and condenses into the trays 13. Each tray 13 is arranged to receive a particular product that is a component of the original crude mixture. Sometimes gravity alone may be used to take the product from the tower 12 to a containment vessel 14, e.g., a drum, for holding purposes. Usually, however, as may be seen in FIG. 1, a pump 16 is used to deliver the product.

In one example, this pump 16, which can be a centrifugal pump, can be the equipment to be cleaned. Other types of equipment, such as control valves, compressors, and the like, can also be cleaned in the refinery in a similar way to that disclosed herein. Moreover, any vessels in the arrangement 10 can also be cleaned in the cleaning process. For example, the tower 12 (also called a column) and the containment vessel 14 may be cleaned. Yet, it should be recognized that the present disclosure is not limited to just this type of arrangement. Other components can be present, including holding tanks, boilers, other types of vessels, etc.

During normal operation of the refinery equipment, product is withdrawn from one tray 13 in the column from an exit port 21 through a pipe 20 into a suction port 26 of the pump 16. Once in the pump 16, the product is acted on by the impellers and driven through a pipe 18 from a discharge port 24 into the containment vessel 14 for holding purposes. The pipes 18 and 20 may be any kind of conduit and having any size. The pipe 18 has an isolation valve 22 disposed therein that is normally open, but may be closed in order to block the discharge end 24 of the pump 16. The other pipe 20 also has such a valve 52 that may be used to block the suction side 26 of the pump 16. When the pump 16 is operating, the product can thereby be delivered from the column 12 to the container 14.

Over time, the pump 16, the tower 12, and other equipment can become contaminated with hydrocarbons. These hydrocarbons will be removed using the cleaning process of the present disclosure.

To do this, the equipment to be cleaned is emptied of free flowing heavy organic solids. To do this, the equipment is typically emptied by draining it. In FIG. 1, for example, this draining can be accomplished by opening the valve 32 that is the lowest bleeder in the blocked section, to eliminate all the processing fluids therein. Also, a vacuum process, steaming, or processes using liquid nitrogen can be used to drain the equipment.

First, the equipment (e.g., pump 16) is blocked or blinded in by closing off all incoming and outgoing fluid valves in a manner known to those skilled in the art. In the example of FIG. 1, this means simply shutting the valves 22 and 52. A bleeder valve 28 tapped into the pipe 18 is then used to gain access for the cleaning system 30 to inject steam and cleaner. It is important to note, however, that refinery arrangements like that disclosed in FIG. 1 also typically have other means of access (e.g., pressure gauge connections) that may work equally well for the purpose of injecting steam and cleaner.

In the cleaning process, the cleaner is administered into the access point bleeder valve 28 or elsewhere by joining the source of refinery steam sources with corresponding sources of cleaner. For example, a source 42 of steam is normally obtained from preexisting steam lines in the plant. The lines 42 selected should have steam temperatures of at least 330-degrees Fahrenheit. Ideally, the line temperatures should be between about 350 to 450-degrees Fahrenheit. The typical 150-psig refinery steam line 42 will work effectively, however, super-heated 40-psig steam lines, which deliver steam at temperatures in excess of 400-degrees Fahrenheit, may be used as well.

Cleaner, the composition of which is disclosed herein, is pumped from a cleaner source 48, which can be a drum of chemical or another container. Both the steam and cleaner are administered to the arrangement 10 using the cleaning system 30, which can include a T-junction 50, or other plumbing. For example, a refinery steam line 42 selected as the steam source for use in the cleaning process can be attached to a steam conduit using a standard connector 58. The line 42 transmits the steam under pressure to a first side of the junction 50. Between the steam line 42 and the junction 50, a valve 38 serves to either open or shut off the source of the steam after the line 42 is attached to the connector 58. Immediately downstream, a check valve 34 allows flow in the downstream direction only. This prevents back flow of cleaning chemical or effluent into the steam source.

The cleaner valve 40 and the check valve 36 are interposed on the conduit between the cleaner source 48 and the junction 50. The cleaner valve 40 is used to either allow or shut off the flow of cleaner from the source 48. The check valve 36 allows flow in the downstream only to prevent the back flow of steam into the cleaner container. A standard elbow can be used to converge the conduits 42 and 44 into the junction 50. After steam and cleaner meet up at junction 50, their collective flows converge into a common line 54. The common line 54 is used to tap the cleaning system 30 into valve 28 in a manner that will be within the knowledge of those skilled in the art. As already stated, other points of access could be used as well.

This valved-junction arrangement enables a user to optionally: (i) introduce neither steam, nor cleaner; (ii) introduce only steam; or (iii) introduce steam and vaporized cleaner into a desired access point in the arrangement 10. Cleaner can be administered using a pneumatic barrel pump 46 (see FIG. 1) that is attached to the connector 48 on the cleaner conduit 44 (See FIG. 2). Alternatively, the pump 46 can be a steam siphon. The cleaner is initially in liquid form, however, when it reaches the valved-junction 50, it is immediately aspirated and vaporized and administered to the arrangement 10 in vaporous form.

In the process, the steam, cleaner, and resulting effluent are handled at the back end and are preferably not vented to the atmosphere. Instead, the steam, cleaner, and resulting effluent are preferably handled by a containment system. After being delivered into the pipe 18 at the valve 28 by the cleaning system 30, for example, the steam (or steam plus cleaner) enters the discharge side 24 of the pump and exit the suction side 26. The effluent that results from the steam and cleaner introduced into the arrangement 10 can be vented to the column 12. With this configuration, the valve 52 is open, and the bleeder 32 closed. Alternatively, the effluent could be vented to another column or a containment vessel. This could be done through the valve 32 or some other access point.

The valve 32 may be used to the drain the pump 16 and to vent effluent during and/or after the cleaning process. As disclosed herein, the handling system 60 allows the effluent to be properly handled before containment or flaring.

Upon introduction to the system, the cleaner will be instantly vaporized by the steam at the junction 50. The steam then carries the vaporized cleaning agent into the pipe 18 and then into pump 16 and/or other equipment. Once the vaporized cleaning chemical enters into the equipment, at least three distinct cleaning actions take place simultaneously. First, the vaporous cleaning agent solubilizes the light end hydrocarbons (benzene, $H_2S$, LEL, etc.) that are present on the inside of the equipment. Once solubilized by the vaporous cleaning agent, these light end materials are carried out of the device in vaporous form through the ventilation process. The vapors coming out of the vent should be handled in accord with the plan set forth in advance.

The valve 32 is opened to drain to the handling system 60 before proceeding to post-processing and containment. When the pump 16 and equipment is drained, liquid effluent comprising contaminate and residual cleaning agent is removed. Vapor is preferably cooled to condense effluent. Any uncondensed effluent can be handled by a flare or scrubber system. The liquid effluent is preferably cooled before entering a containment system. The post processing is made easy because the cleaning agent is all natural, and thus, biodegradable.

The effluent may also be passed directly through post-processing equipment at the refinery, where it will be refined in the normal course of production. Because the cleaning agent included in the drained effluent is a naturally occurring hydrocarbon which does not contain any chelating agents, phosphates, silicates, or any chemicals that would cause problems with treatment facilities, it may be easily re-refined without harming the refinery's equipment.

To handle the effluent produced, for example, the effluent is receive at the inlet 112 of the knockout drum 110. An amount of the effluent is condensed in the drum's interior by passing the effluent from the inlet 112 along the heat exchanger 140 disposed in a shell housed inside the knockout drum 110. Condensing the amount of the effluent involves cooling the effluent by communicating a cooling fluid through the heat exchanger 140. Before releasing the condensed effluent, the interior of the drum 110 is allowed to first fill to a liquid level reaching at least up to the shell in the interior. The condensed amount of effluent is released from the drum's interior through a liquid outlet 114 of the knockout drum 110. Any uncondensed amount of the effluent is released from the drum's interior through a vapor outlet 116 of the knockout drum 110.

As briefly shown in FIG. 1, a handling system 60' can be additionally or alternatively installed elsewhere in the refinery arrangement 10, such as at the drain of the tower 12. The handling system 60' in this configuration would be used for similar purposes as disclosed above.

Having an understanding of the handling system 60 and integrated unit 100 of the knockout drum 110 and heat exchanger 140 and the unit's use in a cleaning system, discussion now turns to further details of the handling system 60 and integrated unit 100.

Figure 2:
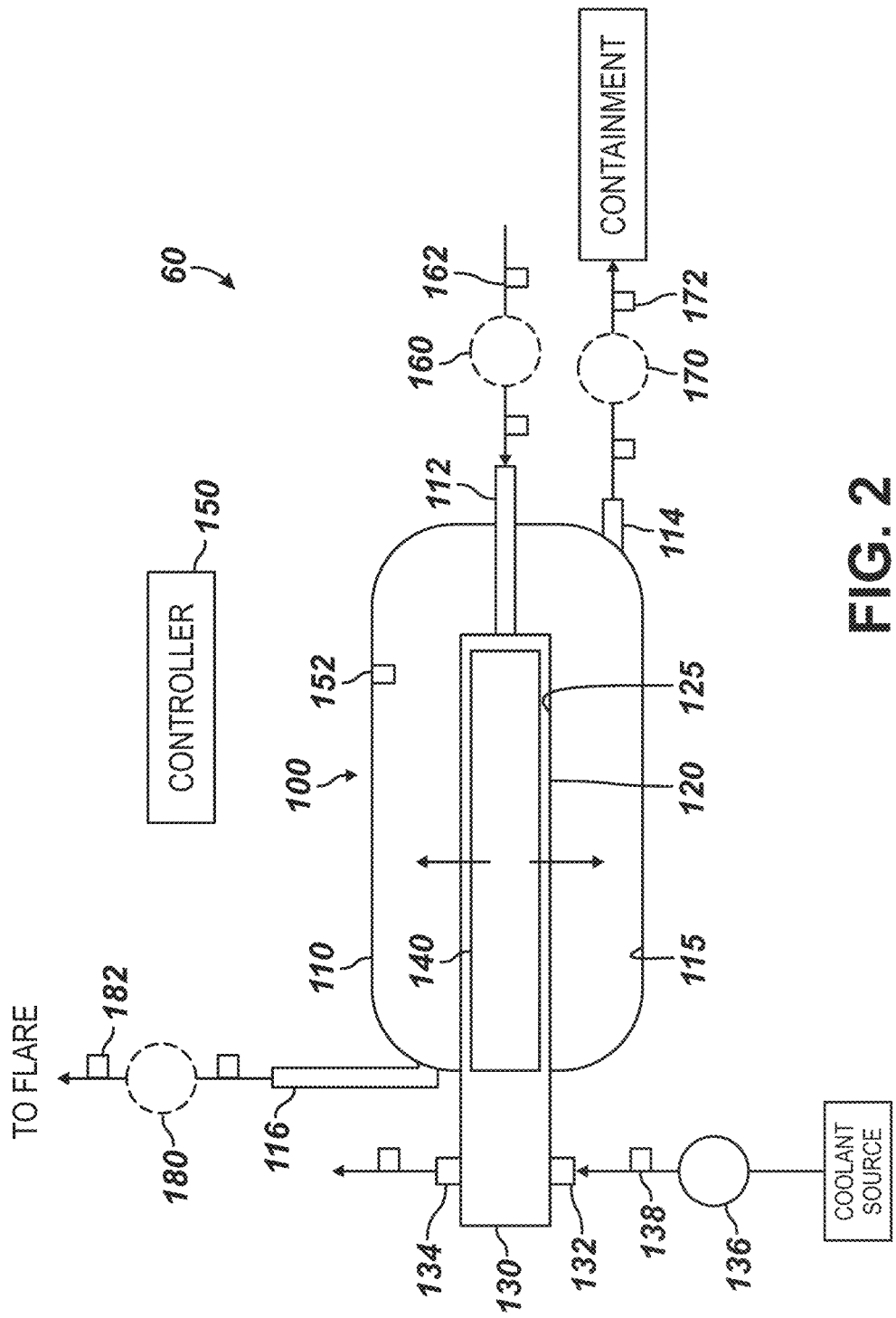
FIG. 2 schematically illustrates a handling system according to the present disclosure.

FIG. 2 schematically illustrates a configuration for the handling system 60 according to the present disclosure. As noted, the system 60 includes an integrated unit 100 operable with a cooling fluid for handling effluent (i.e., steam, cleaner, hydrocarbon, etc.) produced in a cleaning process of refinery equipment. The unit 100 includes a knockout drum or vessel 110 and a condensing heat exchanger 140 incorporated together.

The knockout drum 110 defines an interior 115 and has an inlet 112, a first outlet 114, and a second outlet 116. The inlet 112 is configured to receive the effluent from the cleaning process. The first outlet 114 is configured to communicate a condensed amount of the effluent (i.e., liquid) out of the interior 115, and the second outlet 116 is configured to communicate an uncondensed amount of the effluent (i.e., vapor) out of the interior 115.

A shell 120 is disposed in the interior 115 of the knockout drum 110. The shell 120 has a passage 125 communicating outside the knockout drum 110 at an opening 111. A first distal portion of the passage 125 is disposed in communication with the inlet 112 for the effluent, and at least one second (intermediate/proximal) portion 121 of the passage 125 is disposed in communication with the interior 115 of the knockout drum 110.

The heat exchanger 140 is disposed in the passage 125 of the shell 120. The heat exchanger 140 has a header 130, which includes an input 132 configured to receive the cooling fluid and includes an output 134 configured to expel the cooling fluid.

The handling system 60 can include a controller or control unit 150 and various manual and/or automated controls (152, 160, 170, 180, etc.) for operating the system 60. The controller 150 can include any necessary electronics, processing unit, memory, and the like, as will be appreciated. Depending on the cleaning process involved, the system 60 can be operated during the cleaning process and/or after the cleaning process to handle the effluent produced.

The controller 150 can connect with one or more sensors 152 for monitoring pressure, temperature, liquid level, and other suitable variables inside the vessel's interior 115. The controller 150 can be integrated with a number of other controls to control operation of the handling system 60. For example, an inlet fluid control 160 can be disposed in communication with the inlet 112 of the unit 100 and can include a valve, a pump, or both. One or more sensors 162 can be disposed at the inlet 112 to monitor one or more the pressure, temperature, and flow rate of the effluent.

A first outlet fluid control 170 can be disposed in communication with the first outlet 114 of the unit 100 and can include a valve, a pump, or both. One or more sensors 172 can be disposed at the first outlet to monitor one or more the pressure, temperature, and flow rate of the condensed effluent being communicated to containment.

A second outlet fluid control 180 can be disposed in communication with the second outlet 116 of the unit 100 and can include a valve, a pump, or both. One or more sensors 182 can be disposed at the second outlet 116 to monitor one or more the pressure, temperature, and flow rate of the uncondensed effluent, which can be communicated to a flare or scrubber system at the refinery as necessary.

The inlet pump 160 can be operable to pump the effluent into the shell 120 of the unit 100. The outlet pumps 170, 180 can be operable to draw a pressure on the respective outlets 114, 116.

During operation, the inlet 112 is exposed to an inlet pressure of the effluent. The first and second outlet controls 170, 180, etc. disposed in communication respectively with the first and second outlets 114, 116 can be controllable to produce a pressure differential between the first and second outlets 114, 116 relative to the inlet pressure at the inlet 112. By controlling the pressure differential of the unit 100, the handling system 60 can increase the efficiency of the condensing process of the effluent and can shorten the length of time to complete the cleaning process.

Additionally, a cooling control 136, such as a pump and/or valves, and sensors 138 can connect to the header 130 on the knockout drum 110. The control 136 and sensors 138 can be operated by the controller 150 to pass the cooling fluid from a source through the heat exchanger 140 in the shell 120 of the knockout drum 110.

Figure 3A:
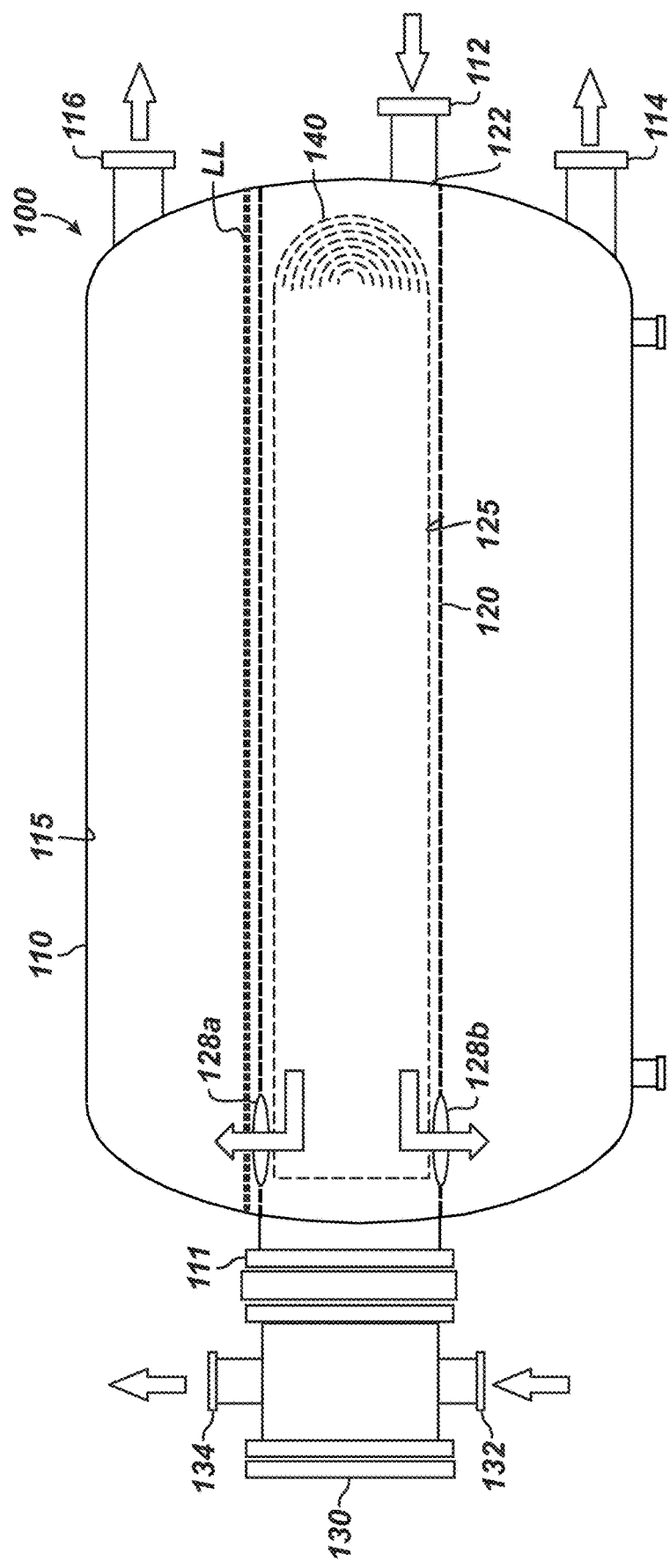
FIG. 3A illustrates a schematic side view of a handling unit according to the present disclosure.
Figure 3B:
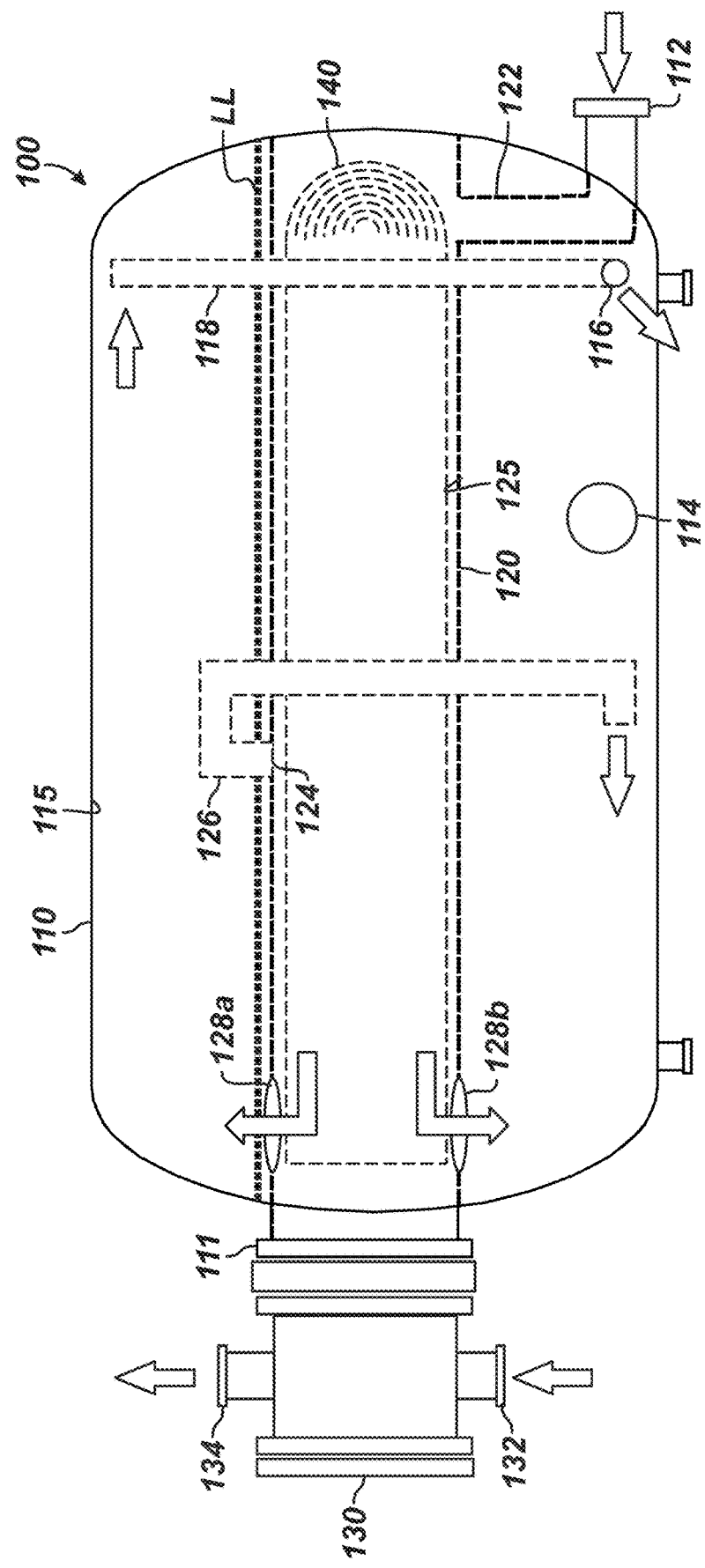
FIG. 3B illustrates a schematic side view of another handling unit according to the present disclosure.

Having an understanding of the unit 100 and some of its components, discussion turns to different configurations for the unit 100. In particular, FIG. 3A illustrates a schematic side view of a handling unit 100 according to the present disclosure, and FIG. 3B illustrates a schematic side view of another handling unit 100 according to the present disclosure. These two configurations are similar to one another and share a number of common features. One or more elements in one configuration can be used for the other configuration as suitable.

Looking at FIG. 3A, the unit 100 again is shown having the vessel or knockout drum 110 and the heat exchanger 140 incorporated together. The knockout drum 110 defines an interior 115 and has an inlet 112, a first outlet 114, and a second outlet 116. The inlet 112 is configured to receive the effluent from the cleaning process, and as shown, the inlet 112 can be a flange connection in the end of the knockout drum 110 that communicates directly into the passage 125 of the shell 120.

As before, the first outlet 114 is configured to communicate a condensed amount of the effluent out of the interior 115, and the second outlet 116 is configured to communicate an uncondensed amount of the effluent out of the interior 115. The liquid outlet 114 can be disposed toward the bottom of the knockout drum 110 below a liquid level LL. One or more such outlets 114 can be provided as desired. The vapor outlet 116 can be disposed toward the top of the knockout drum 110 about the liquid level LL. Again, one or more such outlets 116 can be provided as desired.

The shell 120 is disposed horizontally in the interior 115 of the knockout drum 110 from a proximal end to a distal end. As before, the shell 120 has a passage 125 communicating outside the knockout drum 110 at an opening 111. A first distal portion of the passage 125 is disposed in communication with the inlet 112 for the effluent, and at least one second (intermediate/proximal) portion 128 of the passage 125 is disposed in communication with the interior 115 of the knockout drum 110. In FIG. 3A, a distal port 122 of the shell 120 communicates with the inlet 112. Proximal ports 128a-b of the shell 120 communicate with the drum's interior 115. If desired, an intermediate port (not shown) can be provided in the shell 120 to communicate the shell's passage 125 with the drum's interior 115.

Finally, the heat exchanger 140 is disposed in the passage 125 of the shell 120. The heat exchanger 140 communicates with the header 130 at the drum's opening 111. The header 130 includes an input 132 configured to receive the cooling fluid and includes an output 134 configured to expel the cooling fluid.

Looking at FIG. 3B, the unit 100 has a similar configuration and includes some additional features that may be optional. For example, a conduit 122 can connect the drum's inlet 112 with the distal end of the shell 120. An intermediate port 124 can be provided in a top side of the shell 120 for escape of uncondensed effluent, and a conduit 126 can direct the uncondensed fluid into the interior 115 below the liquid level LL for the knockout drum 110.

The vapor outlet 116 of the knockout drum 110 can include a syphon tube 118 above the liquid level LL and can include other features discussed latter for drawing uncondensed effluent from the drum's interior 115.

Figure 4:
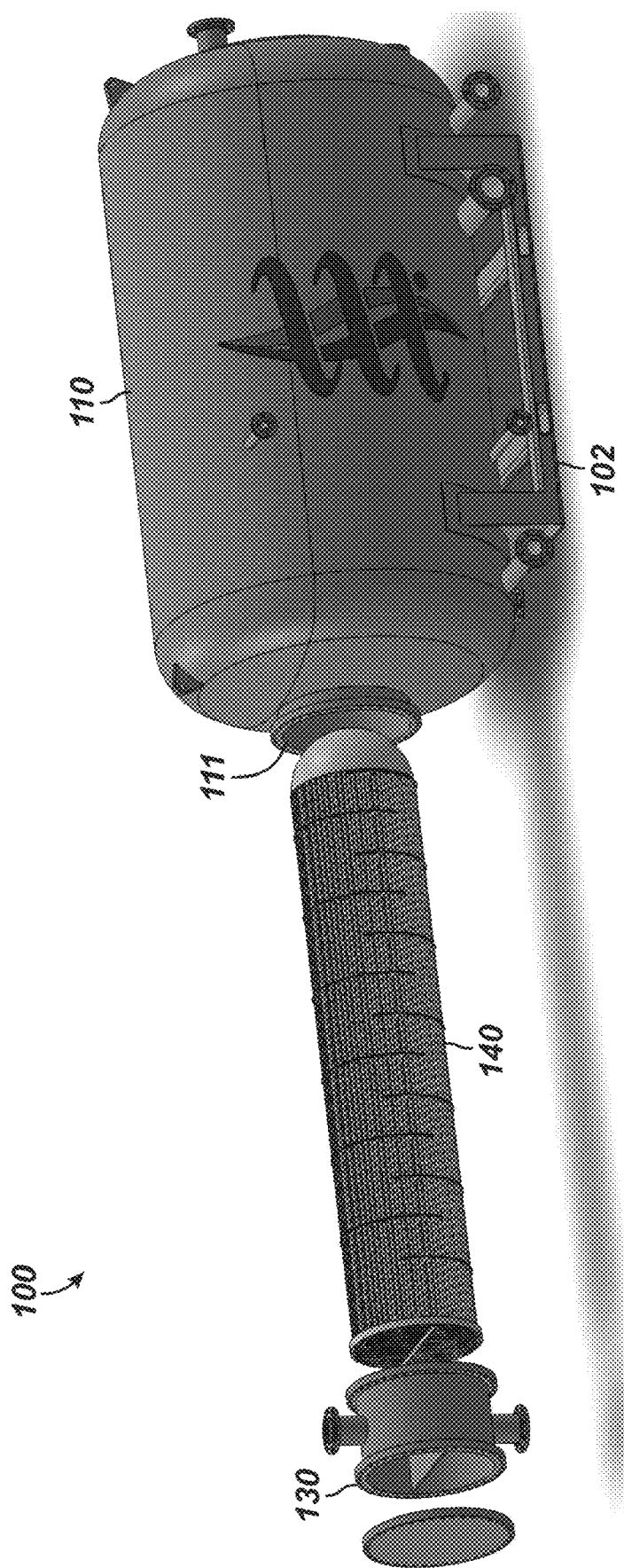
FIG. 4 illustrates a perspective view of a handling unit having a header detached and having a heat exchanger withdrawn.
Figure 5:
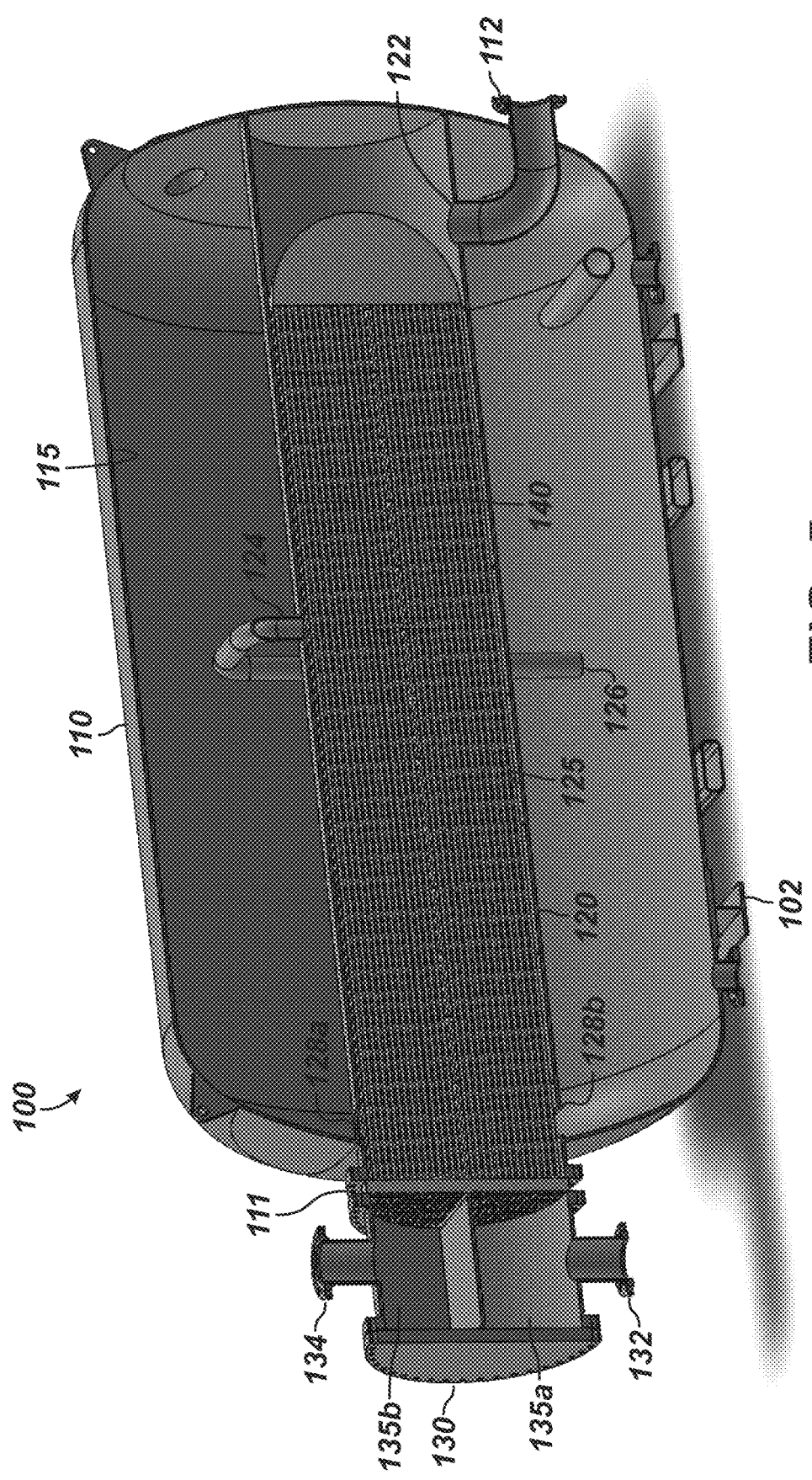
FIG. 5 illustrates a cross-section along a side of the handling unit having the header and the heat exchanger installed.
Figure 6:
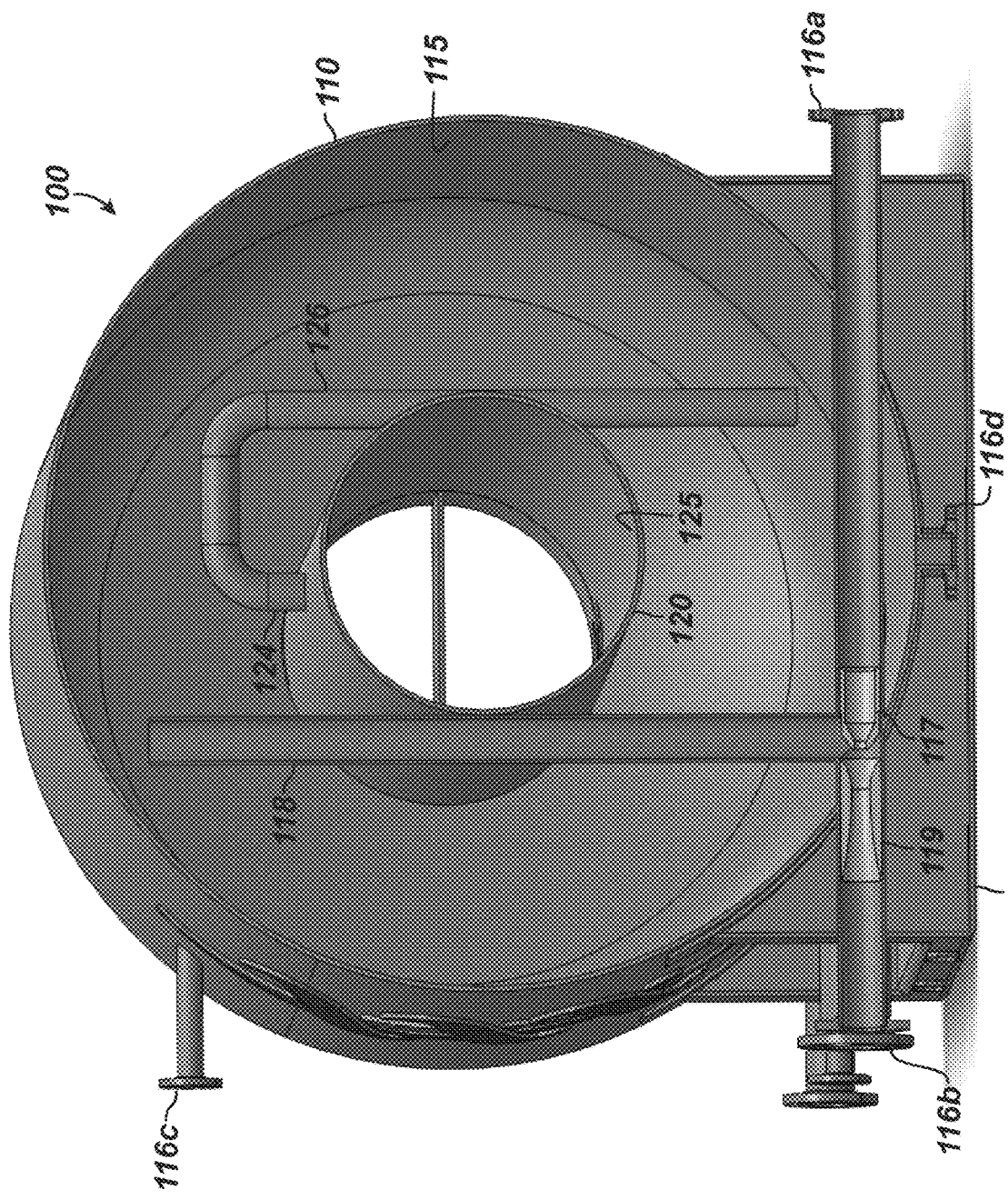
FIG. 6 illustrates an end-section of the handling unit without the header and heat exchanger installed.
Figure 7:
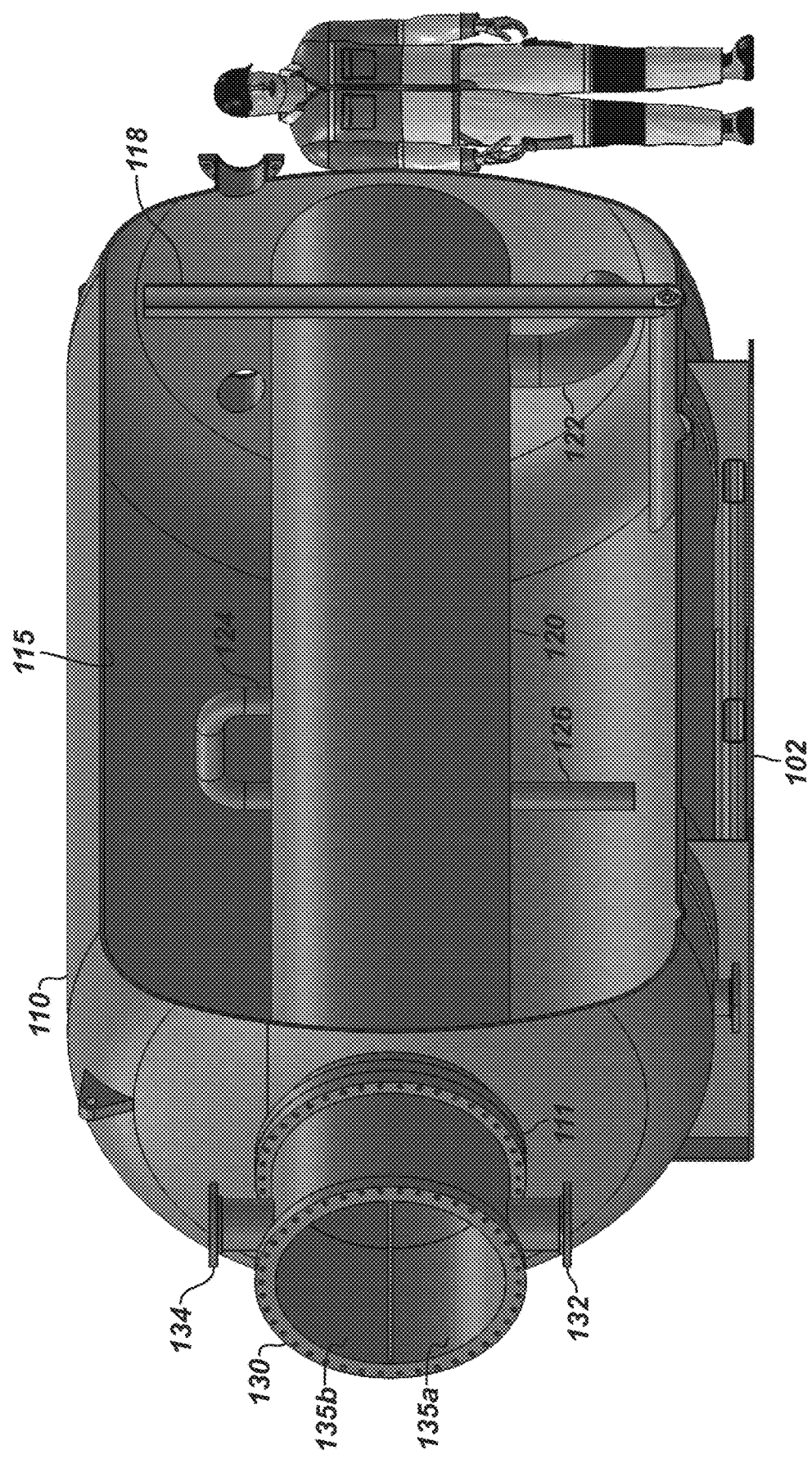
FIG. 7 illustrates a cross-section along a side of the handling unit having the header installed.
Figure 8:
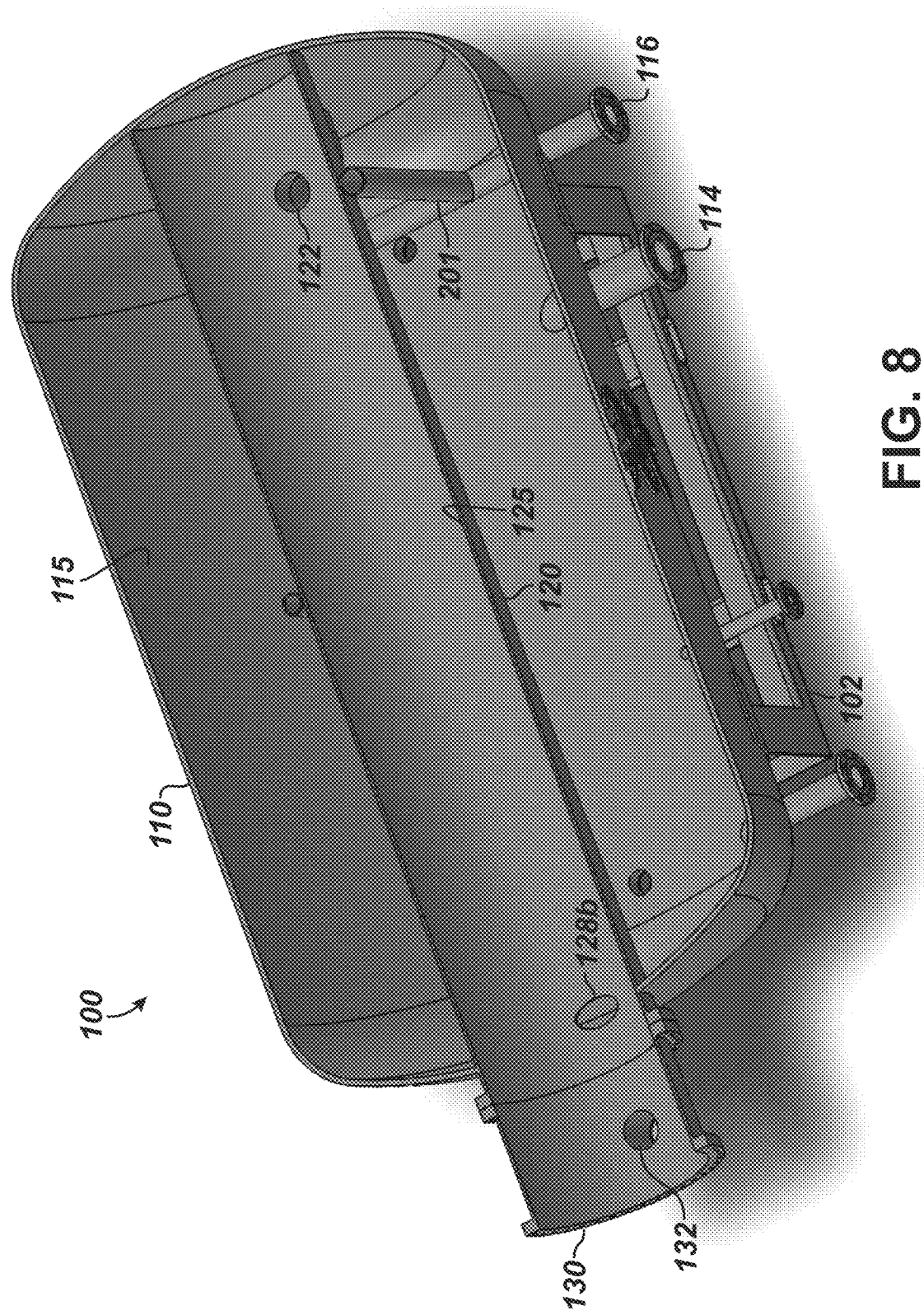
FIG. 8 illustrates a cross-section across a top of the handling unit having the header installed and the heat exchanger removed.

In addition to FIGS. 3A-3B, additional features of the handling unit 110 are shown in FIGS. 4 through 8. Of these, FIG. 4 illustrates a perspective view of the handling unit 100 having the header 130 detached and having the heat exchanger 140 withdrawn from the opening 111 in the knockout drum 110, and FIG. 5 illustrates a cross-section along a side of the handling unit 100 having the header 130 attached to the opening 111 and having the heat exchanger 140 installed in the shell 120 inside the drum's interior 115. FIG. 6 illustrates an end-section of the handling unit 100 without the header (130) and the heat exchanger (140), and FIG. 7 illustrates a cross-section along a side of the handling unit 100 having the header 130 attached. Finally, FIG. 8 illustrates a cross-section across a top of the handling unit 100 having the header (130) attached and the heat exchanger (140) withdrawn.

As shown throughout FIGS. 3A through 8, the shell 120 is a cylindrical sleeve disposed horizontally in the drum's interior 115. A proximal end of the shell 120 communicates with the external opening 111 in the knockout drum 110, where the unit's header 130 connects by a flange connection. A distal end of the shell 120 can be affixed to an inside surface in the interior 115 of the knockout drum 110 through welding or the like.

In one arrangement shown in FIG. 3A, the inlet 112 of the knockout drum 110 can communicate directly with the shell's passage 125 through the distal end of the cylindrical sleeve of the shell 120. Alternatively as shown in FIG. 3B and others, the first distal portion of the shell's passage 125 defines a port for a conduit 122 disposed in the drum's interior 115 and connecting the inlet 112 of the vessel 112 with the shell's passage 125.

As shown in FIG. 3B and others, the shell's passage 125 at its intermediate portion can include a conduit 126 disposed in the drum's interior 115. The conduit 126 extends from a port 124 in communication with the shell's passage 125 and has an open end in communication with the drum's interior 115.

As shown in particular in FIGS. 5 through 7, the shell 120 disposed horizontally in the interior 115 has a top side and a bottom side. The end of the conduit 126 is connected to the port 124 at the top side of the shell 120, and the open end is disposed in the interior 115 below a liquid level of the knockout drum 110. This allows for further cooling and condensation of the vapor.

As shown in particular in FIGS. 5 and 8, the shell's passage 125 includes proximal ports for condensed and uncondensed effluent. A first port 128a is defined in the shell's top side and communicates the passage 125 with the interior 115 for the escape of uncondensed effluent, vapor, and the like. A second port 128b is defined in the shell's bottom side and communicates the passage 125 with the interior 115 for the escape of condensed effluent, liquid, and the like.

As shown in FIGS. 4 and 5, the header 130 is removably affixable to the external opening 111 in the knockout drum 110 and communicates with the passage 125 of the shell 120. In general, the header 130 includes the input 132 and the output 134 for the cooling agent, such as water.

As shown in FIGS. 5 through 7, the header 130 comprises a first chamber 135a disposed in communication with the input 132 and exposed to an upstream portion of the heat exchanger 140. A second chamber 135b of the header 130 is separated from the first chamber 135a by a divider or plate. The second chamber 135b is disposed in communication with the output 134 and is exposed to a downstream portion of the heat exchanger 140.

The configuration of the heat exchanger 140 can take a number of forms. For example, the heat exchanger 140 can include one or more flow tubes disposed in the passage 125 for conducting the cooling fluid from the input 132 to the output 134. The effluent entering the drum's inlet 112 passes in the interstitial spaces between the heat exchanger's tubes as the effluent is passed along the passage 125. A nose can be provided on the distal end of the heat exchanger 140 for dispersing the entering effluent. Heat from the effluent is passed to the cooling fluid in the heat exchanger 140, and the cooling causes some of the constituents of the effluent to condense.

In some cases, pressure in the drum's interior 115 can help move the uncondensed effluent from the vapor outlet 116. If beneficial, suction can be produced on the vapor outlet 116 to remove the uncondensed effluent from the drum's interior 115. For example, a pump or the like can be used to draw a vacuum pressure. In another example shown in FIGS. 6 through 8, a transport fluid can be pulled or pushed by a pump (not shown) through the drum's outlet 116. The uncondensed fluid can then be drawn from the interior 115 of the drum 110 with the produced suction.

As shown in FIG. 6, the vapor outlet includes a cross pipe having input and output ends 116a-b and having a syphon tube 118 extending up into the interior 115 of the knockout drum 110 above the fluid level. A flow restriction produces suction on the syphon tube 118. In particular, a nozzle 117 can be disposed between the input end 116a and the syphon tube 118, and a venturi 119 can be disposed between the syphon tube 118 and the output end 116b. A transport gas, such as nitrogen or the like, can be passed (pumped or drawn) through the input end 116a to the output end 116b. The nozzle 117 and venturi 119 create suction on the syphon tube 118 to draw the uncondensed effluent from inside the drum's interior 115 and out of the outlet end 116b.

As will be appreciated and as shown in some of the Figures, the knockout drum 110 can include a number of additional ports. As shown in FIG. 6, for example, a direct port 116c can be provided in the knockout drum 110 above the liquid line. Such a direct port 116c can be used for injection of an inert gas or to draw uncondensed effluent.

Lower drain ports 116d can be provided for draining the knockout drum 110 after use and for cleaning. Any number of additional ports can be provided for various purposes.

As shown throughout the Figures, the unit 100 can include a support 102 for the handling unit 100. The support 102 can include components of a skid, a pad, a frame, and/or feet. For example, the handling unit 100 of the integrated knockout drum 110 and heat exchanger 140 can be implemented on a skid, which can be transported to the refinery for the cleaning process.

The unit 100 decreases overall system pressure, reduces the total number of hoses and connections needed, removes potential leak points, aggregates the equipment footprint, and achieves additional benefits. The unit 100 is used for few days for the cleaning. At which point, the heat exchanger 140 and other components can be cleaned of any fouling so the unit 100 can be reused.

During operation, the inlet 112 is exposed to an inlet pressure of the effluent. As noted previously, the unit 100 can include a number of controls disposed in communication with the interior 115 of the knockout drum 110 to monitor and control the pressures involved. For example, controls at the drum's outlets 114, 116 can be controllable to produce a pressure differential between the outlets 114, 116 relative to the inlet pressure of the effluent at the inlet 112.

In general, the controls can include a valve operable to control communication through the connection with the drum's interior 115. A control at the inlet 112 can include a pump operable to pump effluent into the drum's interior 115. The controls at the outlets 114, 116 can include pumps to draw a pressure on the respective outlet 114, 116.

The condensed effluent can then communicate into the drum's interior 115 by passing out on of the ports (e.g., 128*b*). Any uncondensed effluent can escape from the shell's passage 125 by passing out one of the ports (e.g., 124, 128*a*). The intermediate port 124 can have the conduit 126 that directs the uncondensed effluent into the condensed effluent, which may further cool the effluent and further condense the effluent. Ultimately, uncondensed effluent can raise out of the top port 128*a* at the proximal end of the shell.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A unit operable with cooling fluid for handling effluent produced in a cleaning process of refinery equipment, the unit comprising:
    a drum defining an interior and having an inlet, a first outlet, a second outlet, and an external opening, the inlet being configured to receive the effluent, the first outlet being configured to communicate a condensed amount of the effluent out of the interior, the second outlet being configured to communicate an uncondensed amount of the effluent out of the interior;
    a shell disposed in the interior of the drum, the shell comprising outer and inner surfaces, the inner surface defining a passage communicating outside the drum, the shell comprising a distal end disposed in communication with the inlet of the drum for the effluent and a proximal end that extends to and communicates with the external opening of the drum, and at least a portion of the passage being disposed in communication with the interior of the drum; and
    a heat exchanger disposed in the passage of the shell, the heat exchanger having an input and an output, the input being configured to receive the cooling fluid, the output being configured to expel the cooling fluid.

2. The unit of claim 1, wherein a first portion of the passage defines a conduit disposed in the interior and connecting the inlet of the drum with a first port defined in the shell.

3. The unit of claim 1, wherein the at least a portion of the passage comprises a conduit disposed in the interior, the conduit having a first end in communication with the passage and having a second end in communication with the interior of the drum.

4. The unit of claim 3, wherein the shell is disposed horizontally in the interior and has a top side and a bottom side; wherein the first end of the conduit is connected to the top side of the shell; and wherein the second end is disposed in the interior below a liquid level of the drum.

5. The unit of claim 1, wherein the shell is disposed horizontally in the interior and has a top side and a bottom side; wherein the at least a portion of the passage comprising a first port defined in the top side and communicating the passage with the interior; and a second port defined in the bottom side and communicating the passage with the interior.

6. The unit of claim 1, wherein the distal end of the shell is affixed to an inside surface in the interior of the drum.

7. The unit of claim 1, wherein the shell comprises:
    an intermediate port defined in a top side of the shell at an intermediate point between the proximal end and distal ends;
    a first port defined in the top side of the shell toward the proximal end; and
    a second port defined in a bottom side of the shell toward the proximal end.

8. The unit of claim 7, further comprising a conduit connected to the intermediate port and extending downward from the shell into the interior.

9. The unit of claim 1, wherein the heat exchanger comprises a header removably affixable to the external opening in the drum communicating with the passage of the shell; and wherein the header includes the input and the output.

10. The unit of claim 9, wherein the header comprises:
    a first chamber disposed in communication with the input and exposed to an upstream portion of the heat exchanger; and
    a second chamber separate from the first chamber, the second chamber disposed in communication with the output and exposed to a downstream portion of the heat exchanger.

11. The unit of claim 1, wherein the heat exchanger comprises one or more flow tubes disposed in the passage and conducting the cooling fluid from the input to the output.

12. The unit of claim 1, wherein the inlet is exposed to an inlet pressure of the effluent; and wherein the unit further comprises first and second controls disposed in communication respectively with the first and second outlets, the first and second controls being controllable to produce a pressure differential between the first and second outlets relative to the inlet pressure.

13. The unit of claim 12, wherein the first and second controls each comprise a valve operable to control communication.

14. The unit of claim 12, wherein at least one of the first and second controls comprises a pump operable to draw a pressure on the respective outlet.

15. A system for cleaning refinery equipment with steam and cleaning agent and for handling effluent produced thereby, the system comprising:
    a source of the cleaning agent configured to connect in fluid communication with the refinery equipment and configured to deliver the steam and the cleaning agent to the refinery equipment; and
    a unit according to claim 1 configured to connect in fluid communication the refinery equipment and configured to receive the effluent.

16. The unit of claim 1, wherein an open space for the effluent is defined between the outer surface of the shell and an inner surface of the drum.

17. A unit for handling effluent comprising:
a drum comprising an inlet, a first outlet, a second outlet, an external opening, and an inner surface that defines an interior of the drum, the inlet being configured to receive the effluent, the first outlet being configured to communicate a condensed amount of the effluent out of the interior, the second outlet being configured to communicate an uncondensed amount of the effluent out of the interior;
a shell disposed in the interior of the drum, the shell comprising outer and inner surfaces, the outer surface of the shell being spaced from the inner surface of the drum and the inner surface defining a passage, and the shell comprising a distal end disposed in communication with the inlet of the drum and a proximal end that extends to and communicates with the external opening of the drum, wherein at least a portion of the passage being disposed in communication with the interior of the drum; and
a heat exchanger disposed in the passage of the shell, the heat exchanger having an input and an output, the input being configured to receive a cooling fluid, the output being configured to expel the cooling fluid.

18. The unit of claim 16, wherein the shell is disposed horizontally in the interior and has a top side and a bottom side; wherein the at least a portion of the passage comprising a first port defined in the top side and communicating the passage with the interior; and a second port defined in the bottom side and communicating the passage with the interior.

19. The unit of claim 16, wherein the heat exchanger comprises a header removably affixable to the external opening in the drum communicating with the passage of the shell; and wherein the header includes the input and the output.

20. The unit of claim 19, wherein the header comprises:
a first chamber disposed in communication with the input and exposed to an upstream portion of the heat exchanger; and
a second chamber separate from the first chamber, the second chamber disposed in communication with the output and exposed to a downstream portion of the heat exchanger.

21. The unit of claim 16, wherein the inlet is exposed to an inlet pressure of the effluent; and wherein the unit further comprises first and second controls disposed in communication respectively with the first and second outlets, the first and second controls being controllable to produce a pressure differential between the first and second outlets relative to the inlet pressure.

22. The unit of claim 21, wherein the first and second controls each comprise a valve operable to control communication.

23. The unit of claim 22, wherein at least one of the first and second controls comprises a pump operable to draw a pressure on the respective outlet.

* * * * *